Aug. 22, 1933.  R. F. MEHL ET AL  1,923,108
MEANS FOR HEATING PHOTOGRAPHIC FILMS OR PLATES
Filed Dec. 30, 1931    2 Sheets-Sheet 1
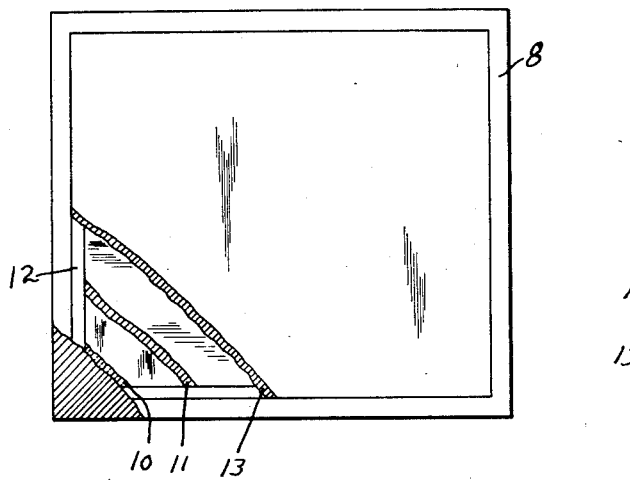
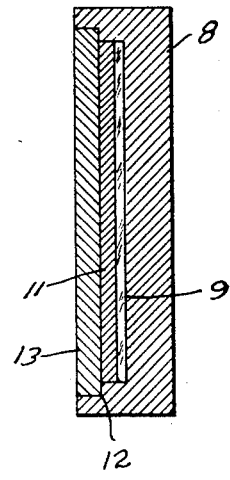
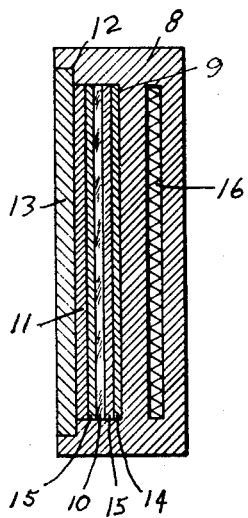
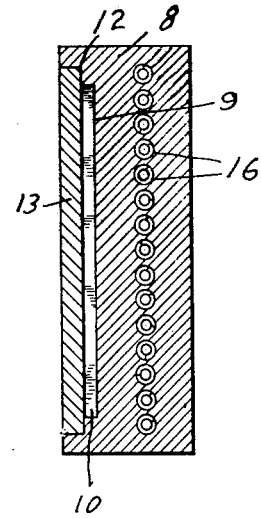
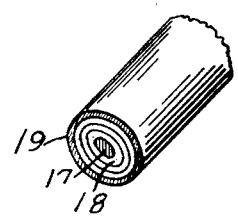
INVENTORS
Robert F. Mehl & James T. Gow
BY
*Robert A. Lavender*
ATTORNEY Aug. 22, 1933.  R. F. MEHL ET AL  1,923,108
MEANS FOR HEATING PHOTOGRAPHIC FILMS OR PLATES
Filed Dec. 30, 1931   2 Sheets-Sheet 2
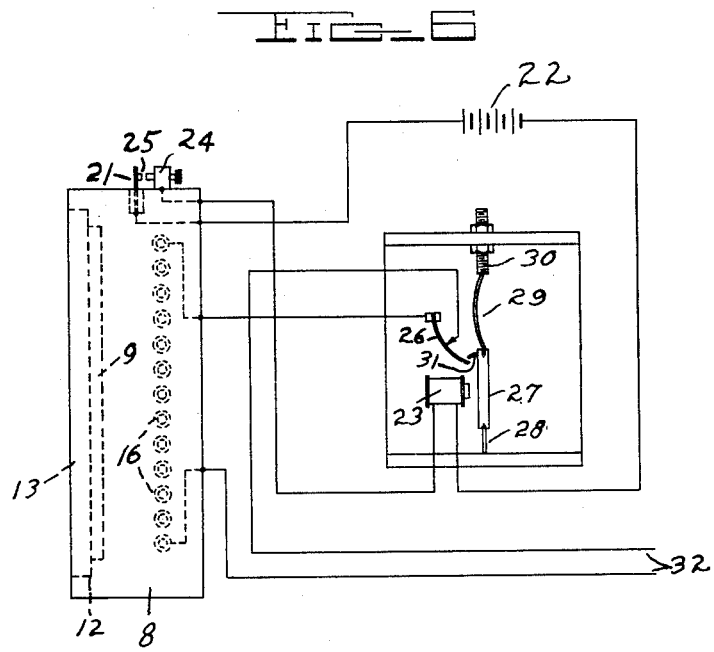
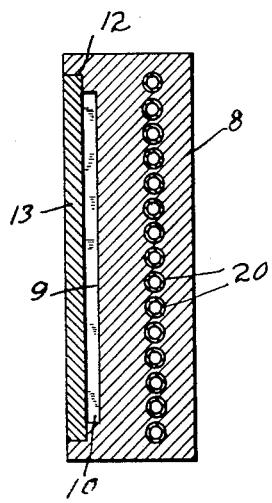
INVENTORS
Robert F. Mehl and James T. Gow
BY
Robert A. Lavender
ATTORNEY Patented Aug. 22, 1933

1,923,108

UNITED STATES PATENT OFFICE 1,923,108

MEANS FOR HEATING PHOTOGRAPHIC FILMS OR PLATES

Robert F. Mehl, Middletown, Ohio, and James T. Gow, Westfield, N. J.

Application December 30, 1931
Serial No. 583,902

13 Claims. (Cl. 250—34)

(Granted under the Act of March 3, 1883, as amended April 30, 1928; 370 O. G. 757)

Our invention relates to a means for heating photographic films or plates to shorten the time required for exposure under certain conditions of photography.

It is the object of this invention to provide a device for heating the films or plates used in making shadow pictures or diffraction pictures by means of electromagnetic radiation to that temperature at which the exposure time is reduced to a minimum and to maintain them at such temperature during any desired period.

With the above and other objects in view, the invention consists in the construction, combination and arrangement of parts as will be hereinafter more fully described.

Reference is to be had to the accompanying drawings forming a part of this specification in which like reference characters indicate corresponding parts throughout the several views and in which Fig. 1 is a plan view, with parts cut away, of one embodiment of our invention;

Fig. 2 is a cross sectional view of a device adapted to be heated by an external source;

Fig. 3 is a sectional view taken along a heating element, showing a film and certain accessories positioned in the heater;

Fig. 4 is a sectional view taken transversely of the electric heating elements;

Fig. 5 is a diagrammatic cross section of a resistance heater element adapted to be used in our invention;

Fig. 6 is a schematic view of our film heater with a suitable thermostatic control for the temperature thereof;

Fig. 7 is a cross section of a form of our heater wherein the heating agent is a material fluid.

It has been found that the exposure time required in making photographs with electromagnetic waves of short length, such as X-rays or electromagnetic radiations from radio-active substances, may be very materially reduced if the sensitized element, such as a film or plate, is heated to the proper temperature. According to our invention this heating is accomplished by so placing the sensitized element that it is heated by conduction from suitable heat sources.

The sensitized element, hereinafter generically termed the film, may be heated and then removed during exposure, or the heating may be continued during the time of exposure.

The body 8 of the heater should be of some material that has high heat conductivity but of low absorption of short electromagnetic waves. It is known that in general the absorption of this type of radiation is smaller the less the density and atomic weight of the material. Aluminum, or aluminum alloy, meets the above requirements very satisfactorily and is the material at present preferred for making the body of our device.

One face of body 8 is recessed to form a chamber 9 to receive the film 10. Uniformity of temperature is more easily maintained when transfer of heat from the film is prevented, and therefore a heat-insulating member 11 is placed between film 10 and cover 13, which also serves to hold film 10 firmly against body 8. Member 11 should have small absorption of the short electromagnetic waves, in addition to being thermally non-conducting; chamois or felt is satisfactory for this purpose.

The upper edge of chamber 9 is rabbeted as shown at 12 to form a seat for a close-fitting cover 13 that prevents entry of light into chamber 9. The cover should have small absorption of the photographic waves, and is preferably of the same material as the body 8. It is desirable that the material back of the film should not scatter radiation back to the film, and while aluminum or an alloy thereof does this to but a small extent the definition in the photograph is enhanced by placing a sheet of lead 14 or other substance, which is highly absorptive of those radiations, between the film 10 and body 8 to intercept any radiation that may have a tendency to move back toward the film.

The exposure time necessary may be further reduced, in addition to the effect of the heat, by placing the film between intensifying screens 15, as indicated in Fig. 3.

When the heating is not to be continued during exposure of the film the form of the invention shown in Fig. 2 may be used, and the heat applied from an external source, but if the temperature of the film is to be kept uniform throughout the exposure one of the modifications including a self-contained heating unit may be employed.

In Figs. 3 and 4 the heat is produced by electric current in resistance coils 16 cast or embedded in the material of body 8, or disposed in suitable recesses therein. A resistance element designed for this use is shown in Fig. 5, and comprises high resistance wire 17 (either straight or coiled) surrounded by insulation 18, the whole being enclosed in a protective sheath 19. In Fig. 7, the heating device consists of a plurality of tubes 20 through which a fluid, such as steam, heated gases, or hot liquid, may be passed, whereby the body 8 will be heated.

The means for keeping the temperature of the body constant is illustrated in Fig. 6. Bimetallic strip 21 is placed in a recess in body 8 to be subjected to the heat therein and is connected in a circuit that includes battery 22, electromagnet 23, and adjustable contact 24. A contact point 25 is carried by strip 21 to react with the point of contact 24. Current to heat coils 16 is supplied through wires 32, one of which is connected to contact switch 26. Adjacent magnet 28 is a small iron armature 27 supported on flexible member 28 normally urged away from the magnet by spring 29 but held under adjustable stress by screw 30. A piece 31 of insulating material extends out from armature 27 toward switch 26 to open the switch when the armature is drawn over against magnet 23. When the temperature of body 8 reaches the desired maximum, the bending of the bimetallic strip 21 serves to contact 24 and complete the circuit through battery 22 and magnet 23, which draws armature 27 over so that insulator 31 opens switch 26 and breaks the heating circuit. When body 8 cools somewhat and strip 21 straightens, breaks the circuit through magnet 23, the magnet is de-energized, spring 29 moves armature 27 back from the magnet 23, and the circuit through the heating coils is again closed.

During exposure the cover 13 is turned toward the object to be photographed, thus presenting a minimum thickness of absorptive metal through which the rays must pass before reaching the plate.

It will be understood that the above description and accompanying drawings comprehend only the general and preferred embodiment of our invention, and that various changes in construction, proportion and arrangement of parts may be made within the scope of the appended claims without sacrificing any of the advantages of our invention.

The herein described invention may be manufactured and used by or for the Government of the United States for governmental purposes without the payment to us of any royalty thereon or therefor.

Having thus described our invention, what we claim is:

1. A holder for use in making photographs with short electromagnetic waves, comprising a body member of material having relatively high heat conductivity and low atomic weight and density having a recess to receive a sensitized photographic element, heating elements in said body, a layer of high absorptive power for short electromagnetic waves in said recess, a pair of intensifying screens between which said sensitized element may be placed, a heat insulating member of low absorptive power for said waves, a heat insulating cover of material over said screens having low absorptive power for said waves.

2. A holder for a sensitized photographic element for use in making photographs with short electromagnetic waves, comprising a body member of metal of high heat conductivity and low atomic weight and density having a recess to receive such sensitized element, electric heating elements in said body, a cover for said recess of material like that of the said body member, a layer of lead in said recess, adjacent thereto two intensifying screens between which said sensitized element may be placed, and a layer of heat insulating material having low absorptive power for short electromagnetic waves between said screens and said cover.

3. A holder for a sensitized photographic element for use in making photographs with short electromagnetic waves, comprising a body member of metal of high heat conductivity and low atomic weight and density having a recess to receive such sensitized element, tubular members in said body member adapted to receive a hot fluid, a cover for said recess of material similar to that of the said body member, a layer of lead in said recess, adjacent thereto two intensifying screens between which said sensitized element may be placed, and a layer of heat insulating material having low absorptive power for short electromagnetic waves between said screens and said cover.

4. A holder for a sensitized photographic element for use in making photographs with short electromagnetic waves, comprising a body member of material of high heat conductivity and low absorptive power for said waves, having a recess therein to receive such element, a lightproof cover for said recess, in the bottom of said recess a layer having high absorptive power for said waves, and heating elements in said body.

5. A holder for a sensitized photographic element, comprising a body member of material having high heat conductivity and having a recess to receive such element, a cover for said recess, in said recess a heat insulating member, and heating elements in said body.

6. A holder for a sensitized photographic element, comprising a body member of material having high heat conductivity and having a recess to receive such element, a cover for said recess, in said recess a heat insulating member and electric heating elements in said body.

7. A holder for a sensitized photographic element, comprising a body member of material having high heat conductivity and having a recess to receive such element, a cover for said recess, in said recess a heat insulating member, and tubular members in said body to carry a heated fluid.

8. A holder for a sensitized photographic element, comprising a body member of material having high heat conductivity and having a recess to receive such element, and an electric heating element in said body, said element comprising a conductor of high resistance, insulation around said conductor, and a protective sheath around said insulating medium.

9. A holder for a sensitized photographic element, comprising a body member of material having high heat conductivity and heating elements embedded in said body.

10. A holder for a sensitized photographic element, comprising a heat conductive body and self-contained heating means.

11. A holder adapted to hold a sensitized photographic element during exposure thereof comprising a body of material having high heat conductivity and photographically permeable to waves electromagnetic waves, and heating elements in said body.

12. A holder for a sensitized photographic element, comprising a body member of material having high heat conductivity and having a recess to receive such element, a cover for said recess, in said recess a heat insulating member readily permeable by short electromagnetic waves, and heating elements in said body.

13. A holder for a sensitized photographic element, comprising a body member of material having high heat conductivity and having a recess to receive such element, a cover for said recess, in said recess a layer of material having high absorption of short electromagnetic waves, and heating elements in said body.

ROBERT F. MEHL.
JAMES T. GOW.